D. TROXELL.
Brake for Children's Carriages.
No. 215,305. Patented May 13, 1879.
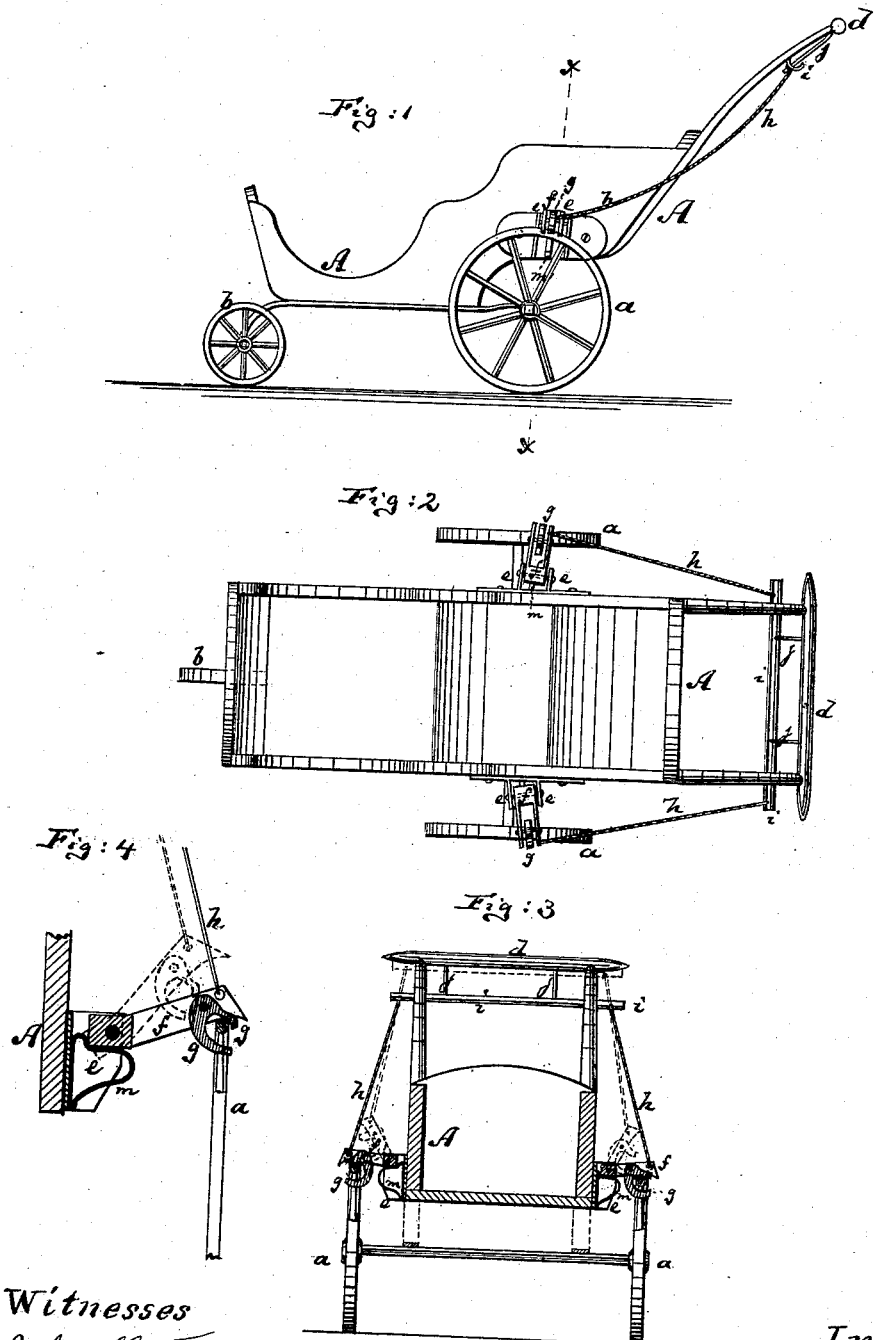
Witnesses
John C. Tunbridge
Willy J. E. Schultz
Inventor
Daniel Troxell
by his attorney
A. v. Briesen

UNITED STATES PATENT OFFICE.

DANIEL TROXELL, OF PHILLIPSBURG, NEW JERSEY.

IMPROVEMENT IN BRAKES FOR CHILDREN'S CARRIAGES.

Specification forming part of Letters Patent No. 215,305, dated May 13, 1879; application filed April 9, 1879.

*To all whom it may concern:*

Be it known that I, DANIEL TROXELL, of Phillipsburg, in the county of Warren and State of New Jersey, have invented an Improved Carriage-Brake, of which the following is a specification.

Figure 1 is a side elevation of a children's carriage provided with my improved brake. Fig. 2 is a top view of the same. Fig. 3 is a vertical transverse section on the line $x\ x$, Fig. 1; and Fig. 4, a partial similar section on an enlarged scale.

Similar letters of reference indicate corresponding parts in all the figures.

This invention relates to an improved brake for children's carriages and other vehicles, which prevents the wheels from turning whenever the carriage is not propelled.

The invention consists in the combination of the carriage-body with pivoted sidewardly-projecting brake-shoes, and in the application to said brake-shoes of pivoted catches, and with means for causing said catches to enter between the spokes of the wheels, and for removing them therefrom by means of the handle.

The invention also consists in the details of improvement, hereinafter more fully pointed out.

In the accompanying drawings, the letter A represents the body of a child's or other carriage, resting on the rear wheel or wheels, $a\ a$, and front wheel or wheels, $b$. The carriage is propelled by means of a handle, $d$, in the ordinary manner, or by other suitable means. To the two sides of the body A, and in line with the wheels $a\ a$ or $b$, if desired, are pivoted, between suitable lugs $e\ e$, the brake-shoes $f\ f$. These brake-shoes when let down project at about right angles from the sides of the carriage-body, and extend over the rims of the wheels $a$. By a spring, $m$, each brake-shoe is held against the rim of its wheel, as shown by full lines in Fig. 4. A rod, cord, or chain, $h$, connects each brake-shoe with a sliding handle, $i$, which handle $i$ is made to slide on pins $j$. Thus, if the handle $i$ is pulled back against the fixed handle $d$, the brakes will be drawn up and off the wheels, as indicated by dotted lines in Fig. 4; but when the handle $i$ is let go the springs $m$, or equivalent weights, will cause the brakes to apply, thus insuring the arrest of the vehicle whenever the attendant is not personally present or in control thereof. In a slot formed at the outer parts of each brake-shoe $f$ is pivoted a clasp or catch, $g$, of suitable form, but preferably U-shaped, as shown. When the shoes $f$ and clasps $g$ are in the position shown in full lines in Figs. 3 and 4, the upper arm of each clasp $g$ extends over the rim of the wheel $b$, while the lower arm enters between the spokes, and absolutely prevents the wheel from revolving. When, however, the shoes $f$ are swung up into the dotted position shown in Figs. 3 and 4, the wheels $a$ are liberated from the catches $g$, and will be free to revolve.

When the handle $d$ is grasped by the person who is to propel the vehicle, said person at the same time grasps the bar $i$, and draws and holds the same against the bar $d$, thus holding both bars while propelling the vehicle.

Instead of the means above described for operating the brakes, other means may be employed.

I claim—

1. The combination of the carriage A with pivoted brake-shoes $f\ f$ and catches $g$, substantially as specified.

2. The combination of the carriage A, having handle $d$, with brakes $f$, cords or rods $h$, and sliding rod $i$, substantially as specified.

3. The combination of the carriage A, having handle $d$, with brake-shoes $f$, catches $g$, cords or rods $h$, sliding handle $i$, and with the springs $m$, substantially as shown.

The foregoing description of my invention signed by me this 1st day of April, 1879.

DANIEL TROXELL.

Witnesses:
F. V. BRIESEN,
T. B. MOSHER.